C. E. STEARNS.
Stair-Rods.

No. 155,625.          Patented Oct. 6, 1874.

Witnesses,
W. J. Cambridge
J. E. Cambridge

Inventor,
Charles E. Stearns
Pr. Teschemacher & Stearns,
Attorneys.

UNITED STATES PATENT OFFICE.

CHARLES E. STEARNS, OF BOSTON, MASSACHUSETTS.

IMPROVEMENT IN STAIR-RODS.

Specification forming part of Letters Patent No. 155,625, dated October 6, 1874; application filed April 29, 1874.

CASE A.

*To all whom it may concern:*

Be it known that I, CHARLES E. STEARNS, of Boston, in the county of Suffolk and State of Massachusetts, have invented an Improved Stair-Rod, of which the following is a full, clear, and exact description, reference being had to the accompanying drawings, making part of this specification, in which—

Figure 1:
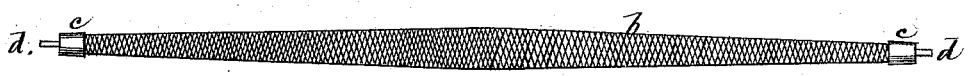
Figure 2:
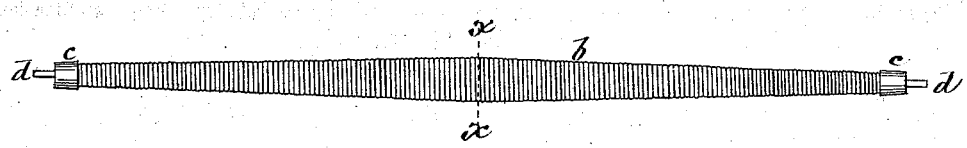
Figure 3:
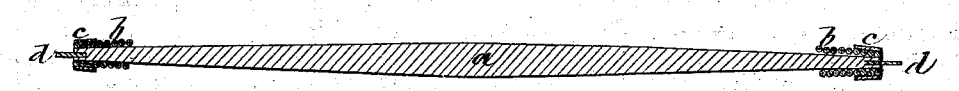
Figure 4:

Figures 1 and 2 represent stair-rods constructed in accordance with my invention. Fig. 3 is a longitudinal section through the center of a portion of the rod represented in Fig. 2. Fig. 4 is a transverse section on the line $x$ $x$ of Fig. 2.

To provide a cheap, durable, and ornamental substitute for the ordinary metallic stair-rod, which is objectionable on account of its expense, is the object of my invention, which consists in a wooden stair-rod covered with wire, wound, braided, or otherwise applied thereto.

To enable others skilled in the art to understand and use my invention, I will proceed to describe the manner in which I have carried it out.

In the said drawings, $a$ is a wooden rod of the form shown, being tapered from the center toward its ends in order that it may possess the required degree of spring or elasticity. This rod is covered with wire $b$, braided closely and tightly around it, as seen in Fig. 1, or wound closely and tightly thereon, as seen in Fig. 2. Each end of the rod is provided with a metallic ferrule, $c$, and a pin, $d$, projecting out from the center of the rod, this pin being inserted within any suitable fastening secured to the stair for the purpose of keeping the stair-rod in place.

The wire forming the covering of my improved stair-rod may be plated with nickel or other suitable metal, either before or after its application to the wooden rod, if desired, and I am thus enabled to furnish, at a low cost, a unique and ornamental substitute for the ordinary stair-rod composed of metal, while, at the same time, I combine lightness and elasticity with strength and durability.

What I claim as my invention, and desire to secure by Letters Patent, is—

As a new article of manufacture, a wooden stair-rod covered with wire, substantially as and for the purpose set forth.

Witness my hand this 22d day of April, 1874.

CHARLES E. STEARNS.

In presence of—
N. W. STEARNS,
W. J. CAMBRIDGE.